(12) United States Patent
MacKay et al.

(10) Patent No.: US 8,215,393 B2
(45) Date of Patent: Jul. 10, 2012

(54) METHOD FOR TREATING WELL BORE WITHIN A SUBTERRANEAN FORMATION

(75) Inventors: Bruce A. MacKay, Sugar Land, TX (US); Philip F. Sullivan, Bellaire, TX (US); Nicolas Droger, Novosibirsk (RU); Ralph M. D'Angelo, Weymouth, MA (US); Douglas E. Miller, Boston, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 336 days.

(21) Appl. No.: 12/574,390

(22) Filed: Oct. 6, 2009

(65) Prior Publication Data
US 2011/0079389 A1   Apr. 7, 2011

(51) Int. Cl.
| | |
|---|---|
| *E21B 33/13* | (2006.01) |
| *E21B 33/138* | (2006.01) |
| *E21B 43/04* | (2006.01) |
| *E21B 43/25* | (2006.01) |
| *E21B 43/26* | (2006.01) |
| *C09K 8/44* | (2006.01) |
| *C09K 8/50* | (2006.01) |

(52) U.S. Cl. ....... 166/276; 166/65.1; 166/285; 166/286; 166/288; 166/292; 166/294; 166/295; 166/300; 166/308.1; 175/64; 175/72; 507/219; 507/224; 507/225; 523/130; 523/131

(58) Field of Classification Search .................. None
See application file for complete search history.

(56) References Cited

U.S. PATENT DOCUMENTS

| | | | |
|---|---|---|---|
| 3,181,612 A | 5/1965 | West et al. | |
| 3,379,253 A | 4/1968 | Chism | |
| 3,603,397 A * | 9/1971 | Peray | 166/270 |
| 4,291,766 A | 9/1981 | Davies et al. | |
| 4,427,069 A | 1/1984 | Friedman | |
| 4,637,467 A * | 1/1987 | Shaw et al. | 166/295 |
| 4,669,543 A | 6/1987 | Young | |
| 5,199,492 A | 4/1993 | Surles et al. | |
| 5,806,593 A | 9/1998 | Surles | |
| 6,450,260 B1 | 9/2002 | James et al. | |
| 6,508,307 B1 | 1/2003 | Almaguer | |
| 6,533,503 B2 | 3/2003 | Pfeil et al. | |

(Continued)

FOREIGN PATENT DOCUMENTS

WO   2008077499   7/2008

OTHER PUBLICATIONS

Odian, George, Principles of Polymerization, Fourth Edition, 2004, pp. 34, 42, 103-105, 437, 527, 528.*

(Continued)

*Primary Examiner* — George Suchfield
(74) *Attorney, Agent, or Firm* — Robin Nava; Daryl Wright; Jeremy Tillman

(57) ABSTRACT

The invention discloses a method of creating a polymerized composition in a well bore: providing a polymerizable composition made of a polymerization initiator and a monomer polymerizable by frontal polymerization; introducing the polymerizable composition into the wellbore; exposing the polymerizable composition to a trigger to activate the frontal polymerization; and creating the polymerized composition.

33 Claims, 2 Drawing Sheets

U.S. PATENT DOCUMENTS

| | | | |
|---|---|---|---|
| 6,815,517 B2 | 11/2004 | Burgel et al. | |
| 7,299,871 B2* | 11/2007 | Hanes, Jr. | 166/295 |
| 7,441,598 B2 | 10/2008 | Nguyen | |
| 2001/0018880 A1* | 9/2001 | Pfeil et al. | 106/803 |
| 2001/0020053 A1* | 9/2001 | Mariaggi et al. | 523/130 |
| 2005/0194142 A1 | 9/2005 | Nguyen et al. | |
| 2006/0037753 A1* | 2/2006 | Hanes, Jr. | 166/295 |
| 2006/0142512 A1 | 6/2006 | Pojman et al. | |
| 2007/0114032 A1* | 5/2007 | Stegent et al. | 166/287 |
| 2007/0114033 A1* | 5/2007 | Hermes et al. | 166/295 |
| 2008/0149328 A1 | 6/2008 | Lee | |
| 2009/0095535 A1 | 4/2009 | Nguyen | |
| 2009/0155485 A1* | 6/2009 | Hoyle et al. | 427/517 |
| 2009/0260818 A1* | 10/2009 | Daniel et al. | 166/288 |
| 2010/0051275 A1* | 3/2010 | Lewis et al. | 166/286 |

OTHER PUBLICATIONS

SPE30467—Screenless Frac Pack Completions Utilizing Resin Coated Sand in the Gulf of Mexico. Kirby, R.L., Clement, C.C., Asbill, S.W. Copyright 1995, Society of Petroleum Engineers. 1995 SPE Annual Technical Conference and Exhibition, Dallas, TX Oct. 22-25, 1995.

SPE39435—New Chemistry and Improved Placement Practices Enhance Resin Consolidtion: Case Histories from the Gulf of Mexico. Parlar, M., Ali, S.A., Hoss, R., Wagner, D.J., King, L., Zeiler, C., Thomas, R. Copyright 1998, Society of Petroleum Engineers, Inc. 1998 SPE International Symposium on Formation Damage Control, Lafayette, LA, Feb. 18-19, 1998.

\* cited by examiner

METHOD FOR TREATING WELL BORE WITHIN A SUBTERRANEAN FORMATION

FIELD OF THE INVENTION

The invention relates to method for treating a well bore within a subterranean formation. More particularly, the invention relates to method for creating a polymeric mass in the well bore using frontal polymerization.

BACKGROUND

The statements in this section merely provide background information related to the present disclosure and may not constitute prior art.

Hydrocarbons (oil, natural gas, etc.) are obtained from a subterranean geologic formation (i.e., a reservoir) by drilling a well that penetrates the hydrocarbon-bearing formation. This provides a partial flowpath for the hydrocarbon to reach the surface. In order for the hydrocarbon to be produced, that is travel from the formation to the wellbore (and ultimately to the surface), there must be a sufficiently unimpeded flowpath from the formation to the wellbore. This flowpath is through the formation rock—e.g., sandstone, carbonates—which has pores of sufficient size, connectivity, and number to provide a conduit for the hydrocarbon to move through the formation.

However, hydrocarbon wells are often located in sections of subterranean formations that contain unconsolidated formation particulates that may migrate out of the subterranean formation with the oil, gas, water, and/or other fluids produced by the wells. When hydrocarbon is produced from the well, formation particulates may travel with the hydrocarbon from the formation, through the wellbore, to the surface. The presence of formation particulates is especially likely in soft formations comprising sand, sandstone, chalk, or limestone. The travel of particulates with the hydrocarbon is undesirable. Particulates flowing through the wellbore will erode equipment in the wellbore and at the surface, which can make replacement of such equipment necessary. Particulates in the produced hydrocarbon must also be removed before the hydrocarbon can be processed. Also, particulates can come to reside in the wellbore to the point where hydrocarbon production is greatly diminished or completely stopped. As referred to herein, "unconsolidated formation particulates" include loose formation particulates and those wherein the bonded formation particulates cannot withstand the forces produced by the production of fluids therethrough.

Different techniques of controlling formation particulates have been developed and are commonly referred to as "sand control operations". When faced with sand control operations, the choice is typically between the use of sand exclusion devices—that usually include a screen and gravel—or screenless completion technologies.

In the conventional sand-control techniques, typically a screen is placed inside the wellbore casing. Gravel is then packed between the screen and the casing. Gravel packs can also be used open-hole (i.e. in wellbores without a casing), or screens can be used without gravel packs. Placing gravel above the fracture pressure of the formation may be termed a "frac-pack". As hydrocarbons are produced from the formation, they travel through the gravel pack and/or the screen before entering the wellbore. The gravel pack and/or screen inhibit the flow of particulates but, under normal conditions, do not substantially inhibit the production of hydrocarbons. Where the internal diameter of the casing is too small, tubing screen assemblies run on coiled tubing may be applied. However, placing a gravel pack and screen requires specialized equipment and access for electric lines that are not always available, especially with offshore wells. Further, the screen and the gravel pack create a mechanical restriction, may be plugged by scales or eroded by the flow of sand, thereby requiring later expensive re-completions.

Screen-less completions involve consolidating the formation by injecting a consolidating fluid comprising, for example, a resin. They offer the advantage of full bore access, lower skins, and reduce the risk associated with running screens into the wellbore. The economic and logistical advantages associated with screen-less completions have made this approach very desirable.

Conventional consolidating fluids comprise a resin, and optionally a curing agent, a catalyst, and an oil wetting agent. When injected into the formation, the resin (acted upon by the curing agent and catalyst, if present) hardens, causing consolidation of the formation to a rigid state and reduction in the concentration of formation particulates. Consolidating fluids and methods for their use are reported in U.S. Pat. Nos. 5,806,593; 5,199,492; 4,669,543; 4,427,069; and 4,291,766. In practice, resins have been used for many years and are effective for short intervals but are recognized to reduce the permeability of the formation, as discussed by Parlar in SPE 39435. Also resin-coated sands have been used both to repair gravel packs and also to provide sand control in the borehole and perforation tunnel. Combinations of sand and resins have also been used as well as fracture treatments to reduce the drawdown and provide sand control in the formation. (SPE 30467)

International patent application WO 2008/077499 discloses a method of downhole dual injection to produce polyurethane foam with a variable density to cure lost circulation. U.S. Pat. No. 6,450,260 discloses the use of flexible gel to consolidate a formation. The consolidating fluid includes a gel component and a gel-forming agent and is injected into the formation under conditions under conditions wherein the consolidating fluid forms a flexible gel, thereby consolidating the formation. According to some embodiments, the consolidated formation is further perforated or fractured.

In certain embodiments, the water soluble polymer is substituted galactomannan, guar gum, hydroxypropyl guar, carboxymethylhydroxypropyl guar, carboxymethyl guar, or guar-containing compound. The treatment fluid may be a drilling fluid, a cementing fluid, a fracturing fluid, or a gravel packing fluid.

U.S. Pat. No. 6,508,307 discloses further a process for stimulating a hydrocarbon-bearing formation comprising the step of determining the direction of maximum in-situ stress within the formation, perforating the formation in a single vertical plane extending in this direction of maximum stress and performing a propped fracturing treatment with a low viscosity fluid. This technology minimizes the undesirable effect of so-called "near-wellbore tortuosity" and may also be used to minimize productions in weak formations. However, the step of determining the direction of maximum stress requires the use of specific tools, such as an ultrasonic imaging tool, that are not always available especially in some remote locations. Moreover, depending on the type of formations, the interpretation of the logs may be extremely difficult so that there is no practical way of determining the direction of maximum in-situ stress with a good accuracy.

Though screen-less completions are clearly desirable, in practice numerous failures have been reported. Therefore, there is a need of providing a method of treating unconsolidated well bore.

SUMMARY

In a first aspect, a method of creating a polymerized composition in a well bore is disclosed. The method provides a polymerizable composition made of a polymerization initiator and a monomer polymerizable by frontal polymerization; introduces the polymerizable composition into the wellbore; exposes the polymerizable composition to a trigger to activate the frontal polymerization; and creates the polymerized composition. The polymeric composition can be a polymeric mass.

In a second aspect, a method to treat a subterranean formation in a wellbore is disclosed. The method provides a polymerizable composition made of a polymerization initiator and a monomer polymerizable by frontal polymerization; introduces the polymerizable composition into the wellbore; and exposes the polymerizable composition to a trigger to activate the frontal polymerization.

In a third aspect, a method of consolidating an unconsolidated zone within a subterranean formation in a wellbore is disclosed. The method provides a polymerizable composition made of a polymerization initiator and a monomer polymerizable by frontal polymerization; provides a downhole tool able to generate a trigger; introduces the downhole tool into the wellbore in the vicinity of the unconsolidated zone; introduces the polymerizable composition into the wellbore; exposes the polymerizable composition to the trigger to activate the frontal polymerization; and leaves a solid polymerized composition in the unconsolidated zone.

In a fourth aspect, a method of creating a permeable screen within a subterranean formation in a wellbore is disclosed. The wellbore comprises a zone with particulates, e.g. proppant or gravel The method provides a polymerizable composition made of a polymerization initiator and a monomer polymerizable by frontal polymerization; introduces the polymerizable composition into the wellbore near the zone; exposes the polymerizable composition to a trigger to activate the frontal polymerization; and creates the polymerized composition within said zone. The result is a screen fused with the particulates. The polymeric composition can be a polymeric mass. The method can be used for gravel packing, or sand control or management.

DETAILED DESCRIPTION

Figure 1A:
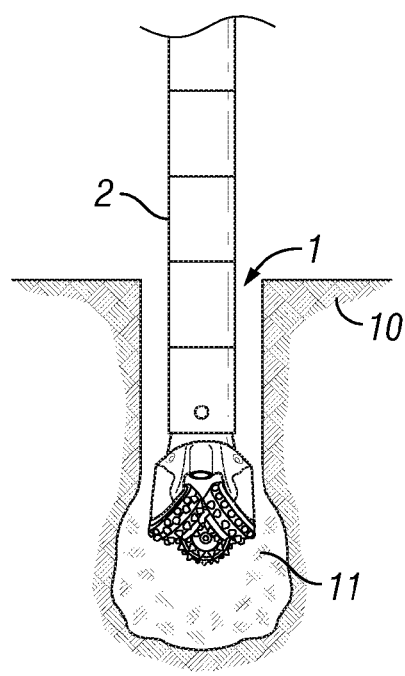
FIGS. 1A-1D show a schematic diagrams of the method according to a first embodiment.
Figure 1B:
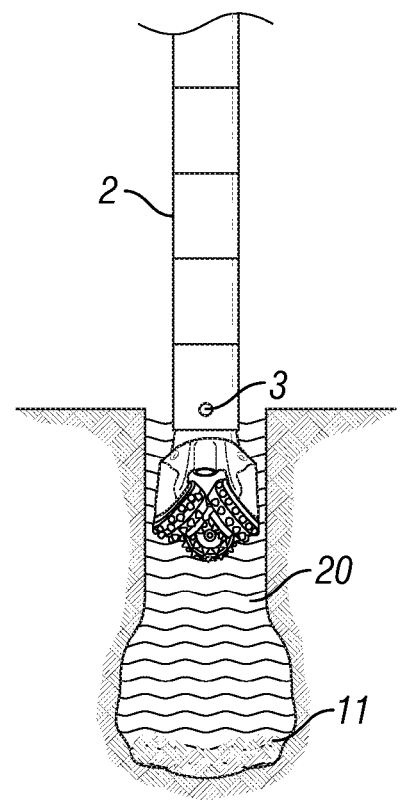
Figure 1C:
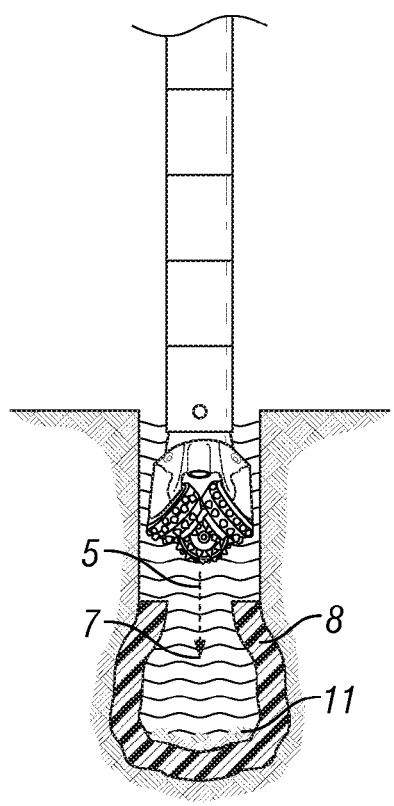

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments of the invention and should not be construed as a limitation to the scope and applicability of the invention. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

A method of placing or flowing a specially designed fluid chemical system is disclosed. The fluid is placed into a particular position within a wellbore and/or subterranean formation and is converted to a solid via a special chemical reaction called Frontal Polymerization (FP). In bulk free radical polymerization, monomers are mixed with free radical initiators and the temperature is raised to encourage radical formation at a known kinetic rate throughout the mixture. Exothermic bond-forming reactions ensue, and the heat from these reactions accelerates both the generation of more radicals from the remaining initiator and the polymerization reactions ("propagation") until the radicals are quenched or the monomer is consumed. By contrast, Frontal Polymerization can be initiated in one position in the bulk fluid, after which the hot reaction frontier propagates through the rest of the fluid until it exhausts the monomer or the progress of the reaction is stopped. The frontier propagates because the rate of heat transfer and the reaction rates are conjoined—the heat helps the initiator to develop radicals, which lead to polymerization, which liberates heat that spreads to the next "cold" zone as the reaction spreads. The front has a linear velocity and a locally high temperature. The three types of frontal polymerizations are thermal frontal polymerization (TFP), which uses an external energy source to initiate the front, photofrontal polymerization in which the localized reaction is driven by an external UV source, and isothermal frontal polymerization (IFP), which relies on the Norrish-Trommsdorff, or gel effect, that occurs when monomer and initiator diffuse into a polymer seed (small piece of polymer). FP can be stopped by cooling, and also by mixing, cavitation, convection, bubble formation, or any phenomenon that grossly perturbs the propagating reaction front. Systems that can support FP will include polymerizable monomers (e.g. vinyl or acrylic monomers) and initiators at a bare minimum. The heat at the reaction frontier can lead to bubbles as components or impurities are boiled, and to convection due to local change in fluid density. Either of these phenomena can retard or even stop FP and therefore it is advantageous to add a thickener (e.g. hydrophobically modified fumed silica such as Cab-O-Sil) to stabilize the fluid. Other additives can include inert fillers, various organic solvents, secondary initiators, cross-linking monomers, polymers, polymerization accelerators, salts, fibers, swelling clays or particles, and pre-hydrated microgels which may be impregnated with other chemicals.

According to a first embodiment, the composition is made of polymerizable monomers and a polymerization initiator. According to some embodiments, the polymerizable monomers may be selected from: acrylic acid, methacrylic acid, styrene, divinylbenzene, vinyl acetate, acrylamide, transition metal nitrate/acrylamide complexes, acrylates such as butyl actrylate, 2-(2-ethoxyethoxy)ethyl acrylate (EOEOEA), tetrahydrofurfuryl acrylate (THFA), lauryl acrylate, phenoxyethyl acrylate, isodecyl acrylate, tridecyl acrylate, ethoxylated nonylphenol acrylate, isobornyl acrylate (IBOA), ethoxylated bisphenol A diacrylate, polyethylene glycol diacrylate (PEGDA), alkoxylated diacrylate, propoxylated neopentyl glycol diacrylate (NPGPODA), 1,6-dihydroxyhexane diacrylate (HDDA), tetraethylene glycol diacrylate (TTEGDA), triethylene glycol diacrylate (TIEGDA), tripropylene glycol diacrylate (TPGDA), dipropolyene glycol diacrylate (DPGDA), ditrimethylolpropane tetraacetate (DITMP TTA), tris-(2-hydroxyethyl)-isocyanurate triacrylate (THEIC-TA), dipentaerythritol pentaacrylate (DIPEPA), ethoxylated trimethylolpropane triacrylate (TMPEOTA), propoxylated trimethylolpropane triacrylate (TMPPOTA), ethoxylated pentaerythritol tetraacrylate (PPTTA), propoxylated glycerol triacrylate (GPTA), pentaerythitol tetraacrylate (PETTA), trimethylolpropane triacrylate (TMPTA) and modified pentaerythritol triacrylate, methacrylates such as allyl methacrylate (AMA), tetrahydrofurfuryl methacrylate (THFMA), phenoxyethyl methacrylate, isobornyl methacrylate, methyl methacrylate (MMA), triethylene glycol dimethacrylate (TIEGDMA), ethylene glycol dimethacrylate (EGDMA), tetraethylene glycol dimethacrylate (TTEGDMA), polyethylene glycol dimethacrylate (PEGDMA), dihydroxybutane dimethacrylate (BDDMA), diethylene glycol dimethacrylate (DEGDMA), dihydroxyhexane dimethacrylate (HDDMA), polyethylene glycol dimethacrylate (PEG600DMA), butylene glycol dimethacrylate (BGDMA), ethoxylated bisphenol A dimethacrylate, trimethylolpropane trimethacrylate (TMPTMA); and/or oligomers or prepolymers, such as bisphenol A epoxyacrylate, epoxidized soybean oil acrylate, epoxy-novolak acrylate oligomers, bisphenol A epoxyacrylate, modified with fatty acids, aromatic monoacrylate oligomers, aliphatic diacrylate oligomer, tetrafunctional epoxy acrylate, amine-modified polyether acrylate oligomer, aliphatic urethane triacrylate, aliphatic urethane tetraacrylate, aliphatic urethane diacrylate, hexafunctional, aromatic urethane acrylate, aromatic urethane diacrylate, aromatic urethane tetraacrylate and tetrafunctional polyester acrylate. According to some embodiments, the polymerization initiator may be an organically substituted ammonium persulfate, a peroxide, especially a dialkyl peroxide, such as di-t-butyl peroxide, a diacyl peroxide, such as dibenzoyl peroxide, a hydroperoxide such as t-butyl hydroperoxide or cumene hydroperoxide, a percarboxylate, such as butyl perbenzoate, a perketal such as 1,1-di-t-butyl-peroxy-3,3,5-trimethylcyclohexane, and/or an azo compound, such as azobisisobutyronitrile, with a self-acceleration decomposition temperature (SADT) of at least 30° C., and preferably of 55° to 120° C. According to some other embodiments, the polymerization initiator may a light activated initiators (being UV or visible light-activated). Those polymerization initiators may be α-hydroxyketone, phenylglyoxylate, benzyldimethyl-ketal, α-aminoketone, mono acyl phosphine, bis acyl phosphine, phosphine oxide, metallocene, iodonium salt. This polymerization initiator can be added to the thermal polymerization initiator, or can be thermal by itself.

According to a second embodiment, the composition may further comprise a thickening agent. The thickening agent may be silica and/or a silicate, such as laponite or bentonite. The thickening agent may be a natural or synthetic polymer selected for solubility in the composition.

According to a third embodiment, the composition may further comprise a filler. The filler may be quartz sand, powdered quartz, pyrogenic silica, corundum, carborundum, carbon black, small glass beads, a carbonate, a sulfate, cement, proppant, resin-coated proppant, a metal powder or granulate, a hydrated phyllosilicate, such as montmorillonite, hectorite and bentonite, an organic filler and/or mixtures thereof. According to another embodiment, the filler is a microwave susceptor.

According to a fourth embodiment, the composition may further comprise a polymerization accelerator, preferably one which can be activated thermally and/or set free thermally at a temperature above 30° C. and preferably at a temperature ranging from 50° to 120° C. In particular, such an accelerator is an amine, preferably a tertiary amine, such as dimethylanaline and/or a metal compound, such as a cobalt or vanadium compound. For adjusting the viscosity it is possible to incorporate additionally in the composition, an inert solvent and/or diluent, such as a plasticizer, particularly a dialkyl phthalate or dialkyl adipate, and/or dimethylformamide.

After the composition fluid is prepared, it can be injected into a formation to consolidate at least a portion of the formation. The portion of the formation may be referred to herein as a "treated zone". A formation is "consolidated" if part or all of it has been treated with the consolidating fluid (i.e. part or all of it is the treated zone) and a polymeric mass formed thereby. Preferably, the polymeric mass has formed in at least a volume comprising a 0.5 ft radius from the wellbore for the fall height of the treated zone. The polymeric mass can be solid.

The portion of the wellbore through which the fluid is injected into the treated zone can be open-hole (i.e. comprise no casing) or can have previously received a casing. If cased, the casing is desirably perforated prior to injection of the fluid. Optionally, the wellbore can have previously received a screen. If it has received a screen, the wellbore can also have previously received a gravel pack, with the placing of the gravel pack optionally occurring above the formation fracture pressure (i.e. a frac-pack).

Techniques for injection of fluid are well known in the art. Typically, the fluid is injected through the wellbore into the formation. Formations for which consolidation is desirable include sand, sandstone, chalk, and limestone, among others. The fluid is suitable for use in all formation types. The volume of fluid to be injected into the formation is a function of the formation pore volume to be treated and the ability of the fluid to penetrate the formation. The volume of fluid to be injected can be readily determined by one of ordinary skill in the art. As a guideline, the formation volume to be treated relates to the height of the desired treated zone and the desired depth of penetration. Preferably, the depth of penetration is at least about 0.5 ft radially from the wellbore into the formation. More preferably, the depth of penetration is at least about 1 ft radially into the formation. Packers or similar devices can be used to control flow of the fluid into the formation for which consolidation is desired.

Techniques to initiate a trigger include heat or electromagnetic radiation (UV, visible light or microwave) initiation. This can be done from surface or in situ in the well with a downhole tool. Energy to initiate the reaction can be low and is depending of the FP chemistry used and of the surrounding parameters e.g. temperature at surface or in the well. As well, the front of the polymerization can be controlled. And polymerization can be stopped, by cooling, by mixing, by cavitation, by convection, by bubble formation, or by any phenomenon that grossly perturbs the propagating reaction front. For example, low-power ultrasound does not interrupt FP, but if the amplitude of 20 kHz passes a certain threshold and induces cavitation in the liquid, then the reaction can be halted. This is of particular interest because of the fact that the sharp contrast at the reaction frontier between solid and liquid should be very easy to detect and follow acoustically. It should be noted that cavitation is unlikely to be produced in subterranean applications for these types of applications. This is an advantage to any acoustic "front tracking".

After the formation has been consolidated, it has been rendered relatively impermeable depending of the types of applications. For example, for some applications, a polymeric mass still permeable but able to stop particulates from a certain geometry is enough. And for example, for some other applications, a polymeric mass wherein its permeability has been reduced by at least about 80%, more preferably by at least about 90%, most preferably by at least about 95% or even 99% is wanted.

Wells for the production of oil, water, and/or gas are installed in a general series of engineering operations that includes drilling, casing, cementing, installing completions, and isolating zones prior to stimulation treatments. Each of these phases can benefit from composition disclosed herewith for creating strong solid substances in selected parts of the wellbore and/or formation.

Figure 1D:
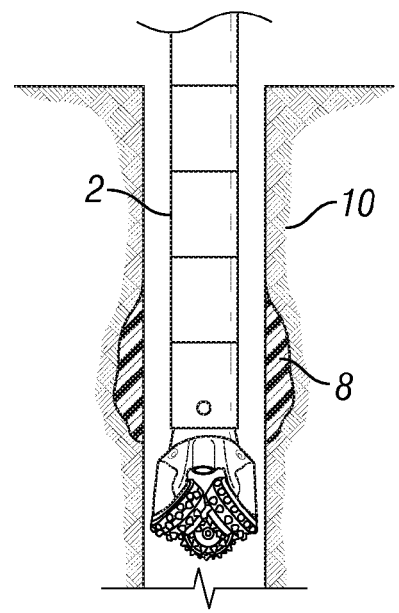
Figure 2A:
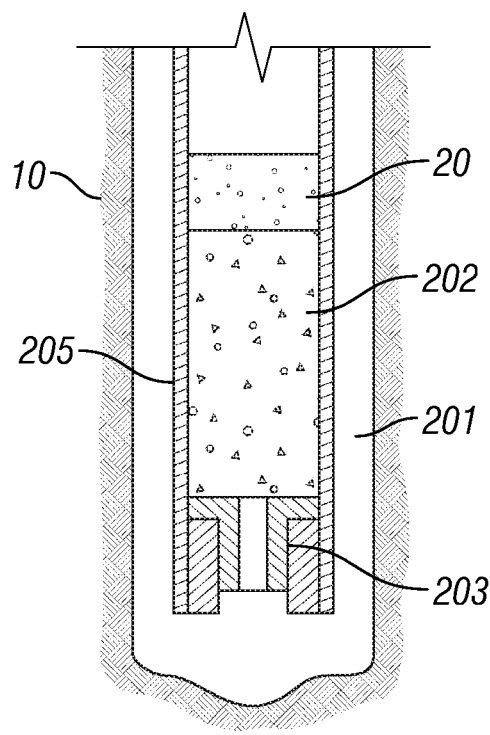
FIGS. 2A-2D show a schematic diagram of the method according to a second embodiment.
Figure 2B:
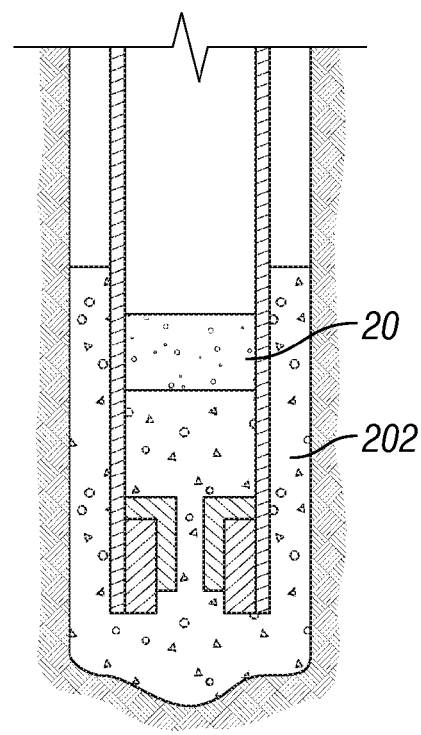
Figure 2C:
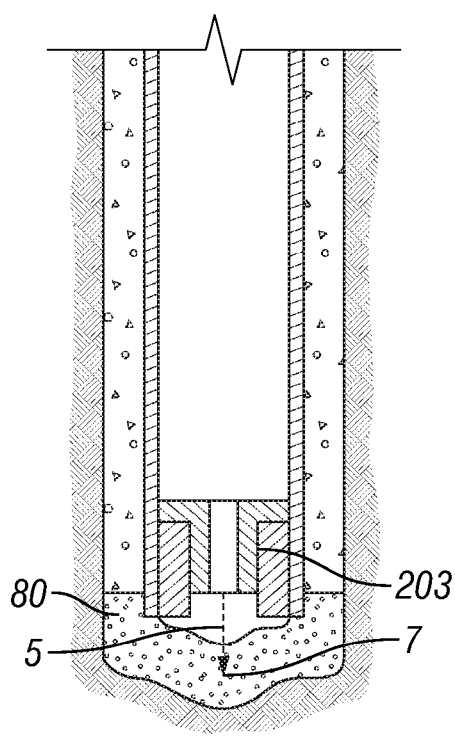
Figure 2D:
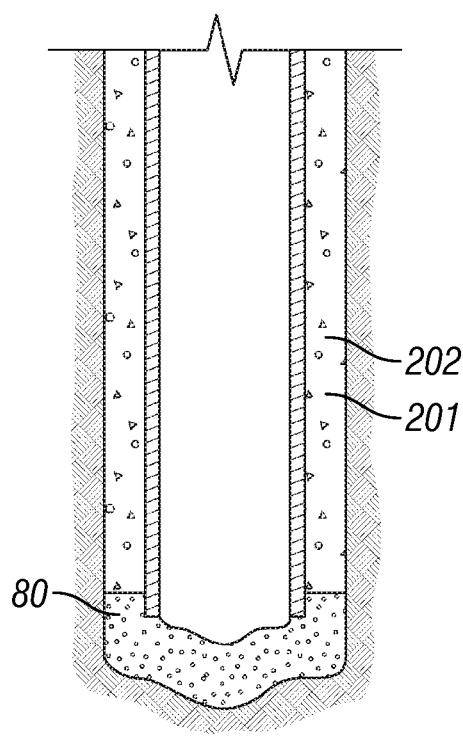

According to one embodiment, the composition may be used in drilling a well or for wellbore strengthening during drilling. FIG. 1 shows a diagram of the method according to one embodiment using the composition disclosed herewith. In drilling a well 1 in a subterranean formation 10 with a drilling tool 2, it frequently arises that the walls of the wellbore lack integrity and begin to deconsolidate or collapse 11 (FIG. 1A). This necessitates periodically stopping the drilling process in order to run casing and cement the casing to the formation, after which drilling can resume. Any chemical treatment that can help to stabilize the wellbore will therefore allow extended drilling operations, which improves cost and time performance. We foresee that when a deconsolidating zone is encountered and drilling is threatened, the drill is withdrawn to the top of the problem area and a fluid 20 that will sustain frontal polymerization is then induced to the wellbore via the bottom hole assembly (BHA) 3 as in FIG. 1B. Once the fluid 20 is located, any of the possible triggers (heat pulse, chemical activator) 5 is applied and the reaction propagates 7, sealing the wellbore with a drillable plastic 8 as in FIG. 1C. The lines symbolize the propagating front which proceeds through the liquid fluid and out into the deconsolidated zone. Drilling can re-commence through the treated region, which has been reinforced with a layer of thermoset or thermoforming plastic with engineered mechanical properties as shown in FIG. 1D.

Lost circulation is a major issue in drilling. Lost circulation can occur when zones with extremely high local porosity/permeability or networks of natural fractures are contacted by the wellbore. The fluid system capable of sustaining FP can be spotted across this type of zone and initiated from the BHA outward. The reaction front follows the path of liquid flow into the porous formation or the natural fracture system, depending. The physical and mechanical characteristics of the resulting plastic material are selected such that, when drilling resumes, the drill string rotates or tears the annular layer of plastic from the pores or fractures in the walls, which remain filled with polymer.

According to a second embodiment, the composition may be used in cementing a well or in lost circulation control during cementing. FIG. 2 shows a diagram of the method according to a second embodiment using the composition disclosed herewith. Cementing operations involve flowing boluses of cement 202 down the newly cased region, through a "shoe" 203 at the end of the casing 205, and up an annular space 201 between the outside of the casing and the wall of the wellbore 10 (conventional cementing shown on FIG. 2A). The rate at which cement solidifies is governed largely by the temperature of the environment in which setting takes place and therefore cement setting is not a truly triggerable event (in fact, cement setting is roughly analogous to bulk free radical polymerization as discussed above). A chemical method wherein a special "chaser plug" of a formulation that can be triggered to set once it has passed through the shoe would help cementing jobs by providing a solid foundation upon which the annular column of cement could reliably stay and solidify. The composition 20 is pumped after the cement 202. The cement 202 is displaced into the annular 201 as on FIG. 2B. When the composition 20 traverses the shoe 203, any of the possible triggers (heat pulse, chemical activator) 5 is applied and the reaction propagates 7, creating a plug in the wellbore 80 as in FIG. 2C. After cement 202 in the annular 201 can set as shown on FIG. 2D. Cement that incorporates chemistry supporting FP would also be useful in that it could be flowed down casing, through the shoe, and up the annulus whereupon setting could be triggered (thermally or chemically) in a "top-down" manner or a "casing-out" manner, depending on operator preference. The exotherm of the frontal polymerization would encourage the cementation reactions. Reaction propagation could even be stopped and re-started if this were required.

Lost circulation is also a problem in cementing, and it is clear that the same general causes of lost circulation that were outlined in the section on drilling can be treated using FP materials in the context of cementing. FP also offers a fix for voids or long annular spaces behind casing where cement was either poorly located or not fully set. In this usage, a suitable FP fluid can be injected into the void space, displacing whatever liquid is present (drill mud, formation fluid, completion brine, et cetera). The fluid can then be triggered to undergo FP, sealing the problem. It may be advantageous to use a fluid that will give a more rubbery and flexible polymer if the source of the problem was physical displacement of the casing within the wellbore.

According to a third embodiment, the composition may be used in cementing or drilling operations to help setting up a cement plug or a diverter for a whipstock, or even as a plug or diverter. The cement plug is fixed in the wellbore to serve as a foundation for directional drilling equipment to begin the lateral sections. Because it is triggerable, an FP fluid would be an ideal adjunct to setting a cement plug in that the FP fluid can be located spatially and "locked" in place by initiation and polymerization. The FP plug could support a cement plug or it could even replace such a plug, depending on temperature and the operational schedule. In openhole situations, this technique could also replace or augment temporary cement plugs that protect weak zones at the bottom of a well while high-pressure operations are performed in upper zones.

According to a fourth embodiment, the composition may be used in zonal isolation. Engineering decisions in completing a well are dependent on wellbore geometry, the location of pay zones and the geological properties of these zones and other zones, among other factors. There are several contexts in zonal isolation that could benefit from frontally polymerized chemical systems. For example, when employing swellable elastomers or other "expanding ring" types of sealing systems to make seals in an annular space in order to isolate zones from each other. A FP system could be flowed into the appropriate annular space prior to a controlled polymerization that would set the seal. The completion could be heated as a trigger for FP, and the outside of the completion could even be impregnated with a chemical trigger, an initiator, and/or an initiator accelerator. This method offers improvements over the typical "swellable packer" in that it copes well with asymmetric wellbores or non-concentric arrangements of completion tubing within the wellbore.

Swellable elastomers are also subject to shrinking if the liquid they imbibe in order to swell is not available—this is not a shortcoming of the FP material. Finally, the location of the packer is distinct from the swellable variety because the latter are fused to the exterior surface of the completion component prior to installation, rendering the packers susceptible to damage when they are run into the hole. FP systems for zonal isolation can also be deployed over very long intervals because they are introduced as liquids and then triggered to set.

According to a fifth embodiment, the composition may be used in sand control. Many formations are unfortunately composed of poorly consolidated sand—a typical treatment in this scenario is to fuse the sand together in a consolidated mass and then establish a propped fracture through the newly-consolidated sand and out into the producing formation beyond the sand zone. A liquid chemical system that can be triggered reliably using frontal polymerization is well suited to sand consolidation. The FP system could be polymerized from the wellbore out over very long intervals or in a wave proceeding along the wellbore for longer distances. It may also be used in the context of gravel packs in that the carrier fluid for the gravel pack could be fused and yet remain permeable. This would allow for stable, high-strength gravel packs. According to another embodiment, the composition comprises a filler which is a resin-coated proppant. Those curable or partially curable, resin-coated proppant can be used as reinforcing and consolidating material for the polymeric mass. The selection process of the appropriate resin-coated proppant for a particular bottom hole static temperature (BHST) are well known to experienced workers. In addition, organic and/or inorganic fibers can also be used to reinforce the polymeric mass. These fibers can have an inherently adhesive surface, can be chemically or physically modified to have an adhesive coating, or can have an adhesive coating resulting from a layer of non-adhesive substance dissolvable by a fluid simultaneously or subsequently passed downhole. The composition has an affinity for the surface of resin-coated proppant such that the composition clings to the surfaces of the resin-coated proppant and gathers at the contact points of the particles. Polymerizing with frontal polymerization this network leaves an interpenetrating network of void spaces that makes for an excellent sand management solution. Result is a permeable pack obtained via frontal polymerization fusion.

After, the zone has been consolidated in order to produce hydrocarbon from the formation through the wellbore to the surface, communication between the formation and the wellbore is established by fracturing or perforating through the consolidated formation.

Methods currently disclosed can be combined with conventional known techniques e.g. hydraulic fracturing. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. In order to maintain the fractures formed in the formation after the release of the fluid pressure, the fracturing fluid can comprise either a proppant, to physically hold the fractures open, or an acid, which can etch the faces of the fracture to provide pores for hydrocarbon production. Preferably, the fracturing fluid comprises a proppant.

Suitable proppants include, but are not limited to, sand, bauxite, glass beads, and ceramic beads. If sand is used, it will typically be from about 8 to about 100 U.S. Standard Mesh in size. Mixtures of suitable proppants can be used. The concentration of proppant in the fracturing fluid can be any concentration known in the art, and will typically be in the range of about 0.5 to about 20 ppa (pounds of proppant added) per gallon of clean fluid. Preferably, the fracturing fluid contains a proppant-retention agent, e.g. a fiber, a curable resin coated on the proppant, platelets, deformable particles, or a sticky proppant coating, to trap proppant particles in the fracture and prevent their production through the wellbore. Fibers or curable-resin-coated proppants are preferred.

Proppant-based fracturing fluids typically also comprise a viscosifier, such as a solvatable polysaccharide or a viscoelastic surfactant, to provide sufficient viscosity to transport the proppant. Other viscosifiers known in the art can be used instead of or in addition to the two listed above. Some viscosity is required to generate the required fracture dimension and to transport proppant. The fracture width and length are affected by the viscosity of the fluid.

In pumping the fracturing fluid into the borehole, it is most economical for the fluid to have as low a viscosity as possible, to minimize the energy expenditure of pumping. On the other hand, some viscosity is required to transport proppant. One of ordinary skill in the art will be able to determine, based on the proppant and other variables, what viscosity increase (through the addition of solvatable polysaccharide or viscoelastic surfactant) is desired.

Perforating the consolidated formation can be performed by techniques known in the art. One common way to do this is to lower a perforating gun into the wellbore using a wireline or slickline, to the desired depth, then detonate a shaped charge within the gun. The shaped charge creates a hole through the consolidated formation. This hole is known as a perforation. Perforating guns are comprised of a shaped charge mounted on a base.

To facilitate a better understanding of the present invention, the following examples of embodiments are given. In no way should the following examples be read to limit, or define, the scope of the invention.

EXAMPLES

A series of experiments were conducted to demonstrate method to treat unconsolidated formation.

A few simple systems based on acrylates have been frontally polymerized in glass test tubes at ambient conditions in the laboratory. Triggers include application of a soldering iron to either the neat liquid or the glass (top, bottom, side—all seem equivalent), application of intense visible light, and addition of a drop or two of N,N-dimethylaniline, which causes the initiator to degrade and release radicals. Cross-linking acrylates such as tri(ethylene glycol)dimethacrylate (TGDMA) with the initiator benzoyl peroxide (BPO) give hard, clear polymers, and the interface between liquid monomer/initiator solution and the newly-formed polymer is evident to the eye because of the difference in refractive index. The rate of propagation in neat TGDMA is 1.1 cm per minute with an initiator loading of 1 g BPO per 100 g TGDMA. The rate does not seem to vary detectably with changes in tube diameter (tube diameters of 0.8 cm, 1.5 cm, and 2.5 cm all showed the same frontal rates at roughly constant velocities). Raising the initiator loading (5 g per 100 g TGDMA is the solubility limit) increases the propagation rate very slightly by an amount that is barely detectable in the system used so far (on the order of 1 to 2 mm per minute increase). Trace water in the TGDMA boils as the reaction front passes, causing bubbles, and therefore faster rates generally show more bubbling which manifests itself as expansion of the cured polymer up the tube in top-to-bottom polymerizations. FP was achieved with initiator loadings of as low as 0.1 g per 100 g, with lowered front propagation (0.6 cm per minute). Cooling or stirring a propagating reaction stops the polymerization, but it can be restarted by application of a soldering iron to the outside of the tube wall. Bottom-to-top polymerizations are possible if the TGDMA is thickened—this is easily accomplished by addition of Cab-O-Sil, a hydrophobically-modified silica, at loadings of 5 g to 15 g per 100 g TGDMA under shear in a Waring blender. At higher than 15 g per 100 g, the fluid has the consistency of peanut butter and can easily be shaped. The polymerization reaction sets the shape quite reliably. TGDMA can be diluted to 35% using dimethylsulfoxide (DMSO) or ethylene glycol monobutyl ether (EGMBE). The polymerization rate seems unaffected by dilution, but the resulting polymer is at least porous and probably permeable because the solvents can be leached out (shrinking the polymer) or replaced using a colored liquid dye. TGDMA/BPO solutions can be emulsified in water-compatible acrylates (e.g. hydroxyethyl acrylate, HEA, with 0.5% ammonium persulfate, or divinyldimethylammonium chloride, DADMAC, in water with 0.5% ammonium persulfate) using surfactants such as AQUET 942 sold by Baker Petrolite, but the radical generation process does not cross the phase boundary and polymerize the other phase—this may be possible if a different initiator is used for the aqueous phase, or it may relate to the high specific heat capacity of the aqueous phase.

The related monomer trimethyloylpropane triacrylate (TMPTA) can be photoinitiated using a combination if the photoinitiator Irgacure 784 (visible light activated titanium-based metallocene initiator) and Luperox D1 (t-butylperoxide). Rates of up to 3 cm per minute are observed, but the monomer can boil. TMPTA can tolerate as much as 40% bentonite by mass and still undergo FP. Hexanedioldiacrylate behaves similarly.

Methacrylic acid undergoes frontal polymerization but it does not form a thermoset plastic. The product of the methacrylic acid frontal polymerization is not soluble in methacrylic acid so the newly-formed polymer drops out of solution and sticks to itself and to the glass wall of the tube, forming a material of considerable mechanical strength. This type of polymerization would be ideal for wellbore stabilization and closing off highly permeable sections of formation. The heat eventually begins to boil the monomer, and therefore confining pressure will be necessary to completely elaborate this monomer for its intended use.

The potential of adding a swelling material to a TGDMA/BOP solution diluted with DMSO to form a swellable porous solid was explored by incorporating 10 g of ground bentonite clay into 60 mL TGDMA/BOP (1%) with 30 mL of DMSO and 7.5 g of Cab-O-Sil as a thickener to support the clay particles. The resulting mass undergoes frontal polymerization to give a rubbery solid that will expand if left for several hours in water.

When frontally polymerized as 0.5% solutions of BOP, the alkyl acrylates n-butyl acrylate and t-butyl acrylate each form rubbery polymers that adhere well to glass and sand. They can be mixed into sand, and the entire mass will polymerize if the sand is warmed a bit before mixing. The rates of polymerization are 1.5 cm per minute for each of these. HEA polymerizes at 3.2 cm per minute under the same conditions to give a similar rubbery polymer. The trend is that smaller monomers polymerize faster, which maps well onto the literature values and matches the notion that local heating and heat transfer processes drive the propagation of the front (smaller monomers undergo more reactions per unit volume, thus the local heat is higher).

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method of creating a polymerized composition in a well bore, comprising:
    a. providing a polymerizable composition made of a polymerization initiator and a monomer polymerizable by frontal polymerization;
    b. introducing the polymerizable composition into the wellbore;
    c. exposing the polymerizable composition to a trigger to activate the frontal polymerization; and
    d. creating the polymerized composition.

2. The method of claim 1, wherein the trigger is temperature, electromagnetic radiation, or a chemical activator distinct from the monomer and/or initiator.

3. The method of claim 2, wherein the electromagnetic radiation is UV or visible light.

4. The method of claim 2, wherein the electromagnetic radiation is microwave.

5. The method of claim 1, further comprising introduction a downhole tool in the wellbore, and wherein the trigger is generated from the downhole tool.

6. The method of claim 5, wherein the frontal polymerization is stopped by thermal modification, by acoustic waves, by mixing the polymerizable composition or by cavitation.

7. The method of claim 1, further comprising stopping the frontal polymerization.

8. The method of claim 7, wherein the frontal polymerization is re-started by exposing the polymerizable composition to the trigger.

9. The method of claim 1, wherein the polymerizable composition further comprises a thickening agent.

10. The method of claim 1, wherein the polymerizable composition further comprises a filler.

11. The method of claim 10, wherein the filler is a microwave susceptor.

12. The method of claim 1, wherein the polymerized composition is solid.

13. The method of claim 1, wherein the wellbore comprises particulates and the polymerized composition is fused with the particulates creating a screen.

14. The method of claim 13, wherein the screen is permeable.

15. The method of claim 13, wherein the particulates are proppant and/or gravel.

16. The method of claim 1, wherein the polymerized composition is a plug.

17. The method of claim 16, being used in conjunction with a method of cementing the wellbore, a method of fracturing the wellbore, or a method of drilling the wellbore.

18. The method of claim 1, wherein the polymerized composition is a layer.

19. The method of claim 18, being used in conjunction with a method of drilling the wellbore, a method of fracturing the wellbore, a method of perforating the wellbore, or a method of cementing the wellbore.

20. A method, comprising:
    a. providing a polymerizable composition made of a polymerization initiator and a monomer polymerizable by frontal polymerization;
    b. introducing the polymerizable composition into a wellbore; and
    c. exposing the polymerizable composition to a trigger to activate the frontal polymerization.

21. The method of claim 20, wherein the trigger is temperature, electromagnetic radiation, or a chemical activator distinct from the monomer and/or initiator.

22. The method of claim 21, wherein the electromagnetic radiation is UV or visible light.

23. The method of claim 21, wherein the electromagnetic radiation is microwave.

24. The method of claim 20, further comprising introduction a downhole tool in the wellbore, and wherein the trigger is generated from the downhole tool.

25. The method of claim 20, wherein the polymerizable composition further comprises a thickening agent.

26. The method of claim 20, wherein the polymerizable composition further comprises a filler.

27. The method of claim 26, wherein the filler is a microwave susceptor.

28. The method of claim 20, wherein the method is sand control, lost circulation, or zonal isolation of the subterranean formation.

29. A method of consolidating an unconsolidated zone within a subterranean formation in a well bore, comprising:
   a. providing a polymerizable composition made of a polymerization initiator and a monomer polymerizable by frontal polymerization;
   b. providing a downhole tool able to generate a trigger;
   c. introducing the downhole tool into the wellbore in the vicinity of the unconsolidated zone;
   d. introducing the polymerizable composition into the wellbore;
   e. exposing the polymerizable composition to the trigger to activate the frontal polymerization; and
   f. leaving a solid polymerized composition in the unconsolidated zone.

30. The method of claim 29, wherein the downhole tool is a drilling tool and the method further comprises drilling the wellbore.

31. The method of claim 29, wherein the trigger is temperature, electromagnetic radiation, or a chemical activator distinct from the monomer and/or initiator.

32. The method of claim 31, wherein the electromagnetic radiation is UV or visible light.

33. The method of claim 29, wherein the trigger is generated from the downhole tool.

* * * * *